United States Patent [19]

Smith

[11] Patent Number: 4,875,187
[45] Date of Patent: Oct. 17, 1989

[54] PROCESSING APPARATUS FOR GENERATING FLOW CHARTS

[75] Inventor: Carolyn M. Smith, Ipswich, England

[73] Assignee: British Telecommunications, plc, London, England

[21] Appl. No.: 78,945

[22] Filed: Jul. 29, 1987

[30] Foreign Application Priority Data

Jul. 31, 1986 [GB] United Kingdom ................ 8618665

[51] Int. Cl.⁴ ............................................. G06F 15/20
[52] U.S. Cl. ..................................... 364/900; 364/300
[58] Field of Search ......................... 364/200, 300, 900

[56] References Cited

U.S. PATENT DOCUMENTS 3,533,086  10/1970  Goetz .................................. 364/300

OTHER PUBLICATIONS

Proceedings of the IEEE International Conference on Circuits and Computers, ICCC80, 1st–3rd Oct. 1980, vol. 1, pp. 107–110, IEEE, New York, US; Rubin: "A Logic Design Data Entry System".

Patents Abstracts of Japan, vol. 6, No. 241 (P-158)[1119], Nov. 30, 1982; JP-A-57 139 868 (Fujitsu).

Journal of Design Automation & Fault-Tolerant Computing, vol. 1, No. 3, May 1977; pp. 257–286, Woodland Hills, US; Smith: "A New Routing Technique to Reduce Interconnection Crossings."

Primary Examiner—Raulfe B. Zache
Attorney, Agent, or Firm—Nixon & Vanderhye

[57] ABSTRACT

A CAD system for determining interconnecting lines for (e.g.) information boxes of a flow chart limits the number of vectors (lines parallel with the vertical and horizontal axes of a display device) used to effect an interconnection. The system follows a number of rules which result in a more aesthetic appearance to the output and reduces the risk of short stepwise changes in interconnections thus simplyfying reading of the display.

9 Claims, 3 Drawing Sheets

PROCESSING APPARATUS FOR GENERATING FLOW CHARTS

BACKGROUND OF THE INVENTION

The present invention relates to a computer aided design system, for displaying block diagrams (i.e. diagrams containing a plurality of boxes, and connecting lines), of the type comprising a data input device, a processing unit, a memory device and an output device for displaying text and graphics.

The term "box" as used herein is intended to mean any shape or feature of such a diagram other than a line, and is not intended to be restricted to boxes of generally rectangular shape. Boxes will usually have associated text, and this is generally located within the box.

FIELD OF THE INVENTION

The term "block diagram" includes flowcharts, data and control diagrams, charts and diagrams and other tree structures, Nassi-Sheiderman charts and other box-within-box structures, and message sequence charts etc.

Computer aided design (CAD systems are known for designing hardware products such as mechanical devices, circuit boards etc, and usually provide a permanent copy of a display design in the form of an engineering drawing. Word processors are known for handling text and more complicated text handing machines are known for preparing publication quality documents.

A computer aided design system for producing block diagrams is shown in the Applicant's co-pending application, filed on 27 July 1987 as U.S. Ser. No. 077,918. This application is specifically directed towards drawing the boxes of a block diagram. Once a means of specifying the boxes has been developed the next requirement is to link the boxes together to show the logical connections on the diagram. These links must also me maintained as boxes change in size and are moved. A problem with known systems is that of providing a suitable routing algorithm which allows the links to be formed easily and quickly.

The basic requirement for a routing algorithm is to link the boxes together by a line or a series of lines. Different diagram types have different linking rules, but the most widely applicable is a system using links consisting of consecutive straight lines which are parallel to the diagram boundaries. These lines must be constructed so that the links are unambiguous and the path is clearly defined at every point. A link may only cross another link of the crossing cannot be interpreted as a junction. There is also a less clearly defined requirement in that each link must be visually pleasing to a user, which in practice means that the links should not crowd the boxes and should be constructed from a small series of long lines rather than a large series of short lines.

DESCRIPTION OF THE RELATED ART

Routing algorithms have been developed in systems for designing printed circuit boards and integrated circuits. Three basic classes of routing algorithms may be identified, namely maze routing, line routing and channel routing.

Maze routing is based upon the definition of the systems in terms of a grid. A path is then found between points on the grid by labelling cells.

Line routing is based upon the construction of the route from a series of horizontal lines, vertical lines and the definition of directions in which the next part of the route should be tried.

Channel routing allows the paths of other links to be taken into account when choosing a route. The algorithm then defines areas or channels in which links may exist.

Problems are encountered with each of the aforementioned known algorithms. Maze routing should always find a route if one exists but it requires intensive computation and tends to product links consisting of a large series of short lines. Line routing tends to produce longer lines but it cannot always find a route even if one exists. The problems encountered with maze routing also occur with channel routing which again tends to produce a lot of short lines.

SUMMARY OF THE INVENTION

In accordance with the present invention, there is provided apparatus for generating a flow chart or the like connected diagram consisting of boxes, joined by connecting links, the apparatus comprising, a data processing unit, an input device, and a display device having vertical and horizontal axes, wherein the data processing unit includes means for causing the display on the display device of a plurality of boxes and means for accepting from the input device data identifying a starting boxes and an end box, the processing unit further comprising means for causing the display on the display device of a connecting link between the starting box and the end box, including, (a) means for defining a link start point associated with the starting box, and a link end point associated with the end box, (b) means for calculating whether first and second lines joining the link start point and respective first and second intermediate target points are obstructed by a non-permitted obstacle, the said lines being parallel respectively to the horizontal and vertical axes of the display device, and having a length equal respectively to the horizontal and vertical displacement of the link end point from the link start point, such that the said intermediate target points may be joined to the link end point by respectively third and fourth lines parallel respectively to the vertical and horizontal axes, (c) Means for determining, in the event that no such obstacle is discovered, whether the said third and fourth lines joining the said intermediate target points, and the link end, point, are obstructed by non-permitted obstacles, and for generating, in the event that no obstacle is encountered to the said two lines, a connecting link on the display device, composed of the first and third, or of the second and fourth said lines, (d) means for determining, in the event that either the said first and said second lines are obstructed, whether a channel exists which is not obstructed by non-permitted obstacles, the said channel joining the respective first or second line, and a line parallel thereto, and displaced therefrom by respectively the vertical or horizontal displacement of the link start point from the link end point, (e) means for storing a value to indicate the first and second lines respectively to be allowable, in accordance with whether or not a corresponding channel is found to exist for the said lines respectively, and means for defining the junction of the channel with the respective first or second line as a new start point, in the construction of the desired connecting link. The steps carried out by the respective means (a), (b), (c) and (d) above are then repeated for the new start point.

In accordance with the method, two parts of a link line (referred to as "vectors") are considered, before a decision is taken as to the first part or vector, and the first vector is marked as possible only if the second vector meets certain defined criteria.

The concept of a "vector" has been introduced to simplify checks for the positioning of links among boxes. A vector is part of a link, which is a straight line, parallel to the horizontal or vertical axis on the display device. It has a defined start point, end point and direction. A vector can be joined to other items at its start point, but in order to maintain the unambiguity of links, it can only be joined to one item at its exit. In certain circumstances, this other item may be a vector, and in that case, the vector must maintain the direction of flow.

By the above method of link is first sought which consist of only two vectors. If such a link cannot be found, then a search is undertaken for a free channel through which the link may pass, which extends for the full distance (in either the horizontal or vertical direction) between the start and end points. This has the effect of minimising the total number of vectors used to form a link, and thereby improve the overall aesthetic appearance of the chart.

In a preferred embodiment, if a channel cannot be found between the start and end points in either the vertical or horizontal directions, a channel is sought outside the rectangle of which the start and end points form opposite corners, either by extending one of the first or second lines, or by seeking a channel joining a fifth line, extending from the link start point away from the link end point.

Accordingly, in a particular preferred embodiment of the invention, there is provided apparatus as described above including means for determining, in the event that both the third and fourth lines are obstructed by non-permitted obstacles, and at least one of the first and second lines are not obstructed by non-permitted obstacles, whether a channel exists which is not obstructed by a non-permitted obstacle, the said channel joining an extension of the respective non-obstructed first or second line and a line parallel thereto and displaced therefrom by respectively the vertical or horizontal displacement of the link start point from the link end point, and for defining as a new start point the junction of the said channel with the respective first or second line.

In a further alternative preferred embodiment, there is provided apparatus as described above including means for determining, in the event that both the said first and second lines are obstructed by a non-permitted obstacle, whether a fifth line, extending from the link start point away from the link end point, parallel to the vertical or horizontal axis is obstructed by a non-permitted obstacle, and means for determining in the event that the said fifth line is not so obstructed whether a channel exists which is not obstructed by a non-permitted obstacle wherein the said channel joins the said fifth line and a sixth line, parallel to the fifth line and displaced therefrom by respectively the horizontal or vertical displacement of the link end point from the link start point, and means for defining as a new start point the junction of the said channel with the fifth line.

BRIEF DESCRIPTION OF THE DRAWINGS

A preferred embodiment of the invention will now be described, with reference to the accompanying drawings, in which.

DESCRIPTION OF THE PREFERRED EMBODIMENTS

Figure 5:
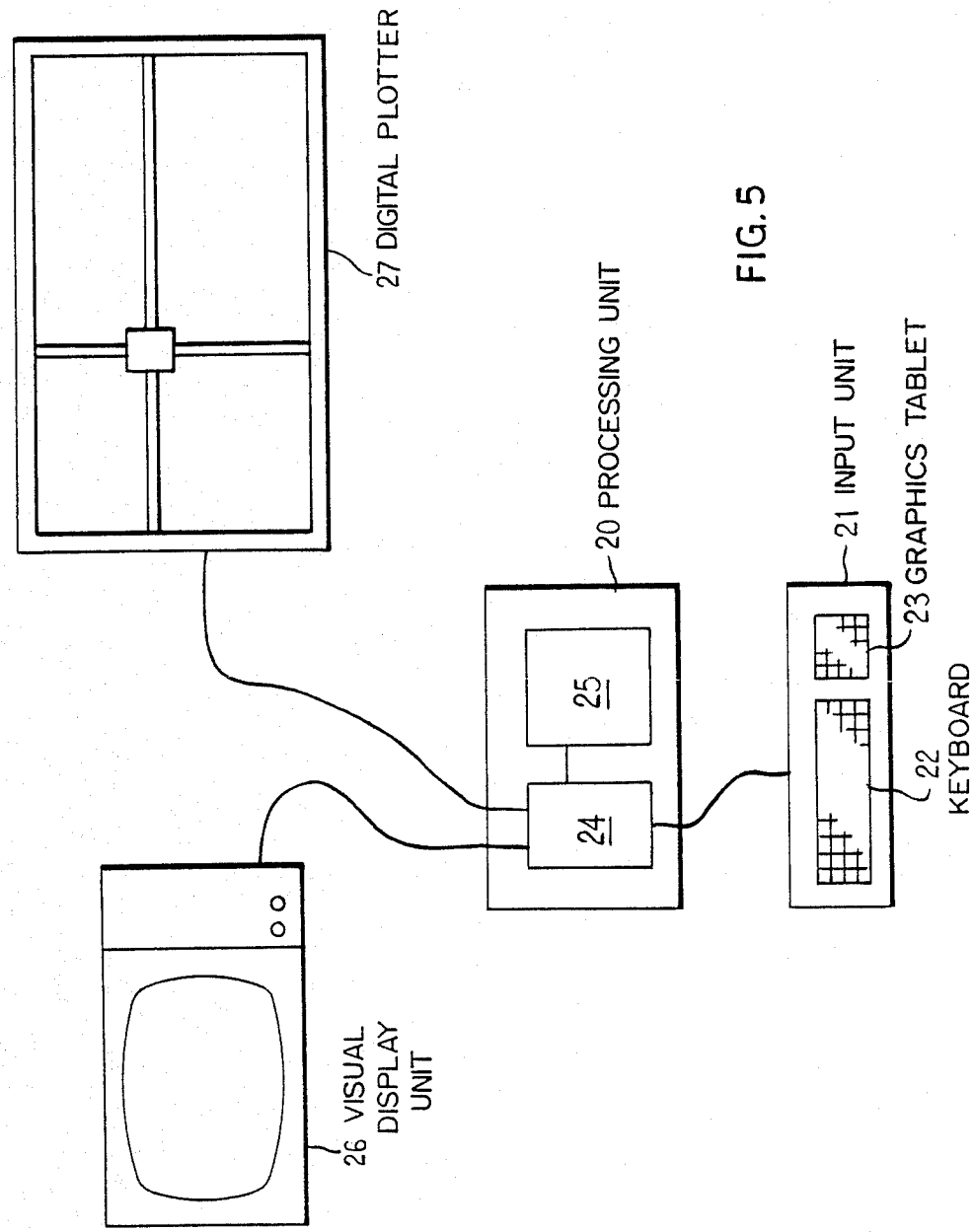
FIG. 5 is a general representative of apparatus in accordance with the invention.

Referring first to FIG. 5, apparatus according to the invention, includes a central processing unit 20, having a processor 24 and Random Access Memory 25, an input device 21, consisting of an alphanumeric keyboard 22 and a graphics tablet 23, and two display devices, a VDU 26 and a digital plotter 27. Alternative input devices, for example a mouse or trackball may alternatively be utilised.

Boxes are generated on the display device by the data processing unit, based on data supplied by the user from the input device. The computer program operating in the data processing unit is so arranged as to accept textual data, associated with each of the boxes and to display the textual data within the respective box. An editor is provided which is adapted to vary both the size and shape of each box, in dependance upon the text associated with it.

Means are also provided within the computer program for enabling the user, via the input device, to specify that a directed link is to be made between two selected boxes.

A check is first made to ensure that the input from the user, identifying the boxes between which the link is to be made, is valid, i.e. that the start box has an exit free and the end box has an entry free. In a preferred embodiment of the invention, means may also be provided for producing connecting links between vectors, as well as between boxes, and in this event, the check should also ensure that the end point and start point are different.

The next step undertaken by the processing unit is to determine a link start point A, and a link end point B, outside the respective start and end boxes, which are the points which will actually be joined by a link, in the resulting flow chart.

The method adopted by the apparatus for connecting the link start point and the link end point in accordance with the invention can best be explained by illustrating first a simple case not in accordance with the invention, and then considering more complex cases.

The most simple case for the construction of a route is where the start and end points of a links can be joined by one line, which is parallel to a diagram boundary. The link can then be made by the insertion of one vector. Once the proposed path has been identified, this path is checked to ensure that the vector will not break any of a number of defined coincidence rules. Atypical set of coincidence rules for a computer flow chart will be as follows:

(1) The vector must leave the start box from an exit which is not already used, and must leave it by an allowed direction of the exit, (referred to herein as an escape direction).

(2) The vector must end outside the space occupied by the box on the chart, (referred to herein as the box selection window.

(3) If the vector is to be joined directly to the end box it must approach from an escape direction.

(4) The presence of any boxes in the route apart from the start and end boxes forms a block to the route.

(5) The vector must not cross any vector to vector joints (nodes) unless the link of which they are a part has the same end box as its destination. If so, a joint can be made to this link at this point.

If none of these coincidence rules have been violated, the vector can form the join between the two boxes, and a corresponding line is produced on the display device.

In general, it will not be possible to produce a direct link between the starting box and the end box, either because the starting box and the end box are at different vertical or horizontal positions, or because a blocking system is present.

Each of these situations will now be dealt with separately.

Figure 1:
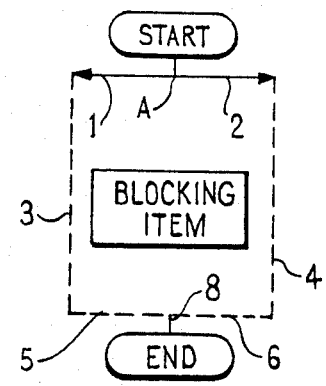
FIGS. 1 and 2 are representations of sections of a flow chart diagram.

FIG. 1 illustrates the case in which the start point and end point are in line, but the direct route is blocked by an item which cannot be crossed. The method used is to attempt initially to use an alternative direction from the start point, indicated on FIG. 1 as 1 and 2.

Changing the direction of the route in this way may bring other blocking items into the path of the next part of the route. First, the apparatus determines a start point A, and an end point B, outside the start and end boxes. The apparatus is programmed and arranged to determine the length needed for lines 1 and 2 to enable vectors to be created equal in length to the vertical displacement of the start point which do not cross any non-permitted obstacle (3 and 4 respectively). A test is then carried out to determine whether or to any obstruction exits in the route from the lower end of vectors 3 and 4 to the end point B (lines 5 and 6 respectively). If only one route exists which is not blocked, this route is chosen, and the corresponding link is drawn. If both routes are not blocked, then the shortest route is chosen or else a random choice is made.

Because the links 3 and 4 are chosen to be only in a position where they can extend for the full vertical displacement of points A and B, it is ensured that the finished link does not include a large number of individual parts.

Dog Leg Route—Start And End Points Not In Line

Figure 2:
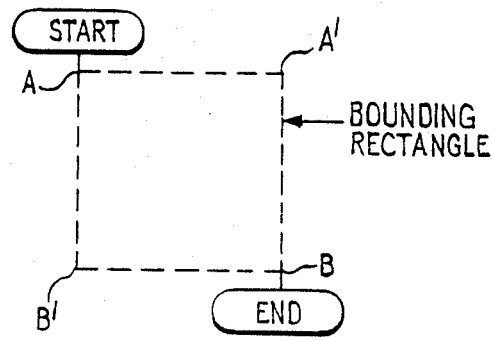
Figure 3:
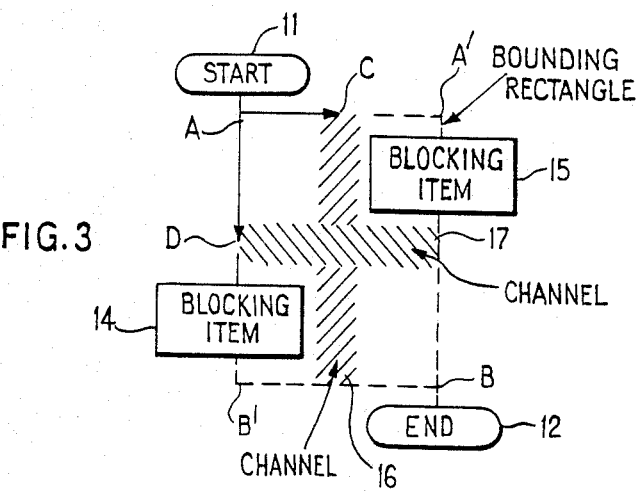
FIG. 3 is a section of a more complex flow chart diagram, illustrating the system in accordance with the invention.

This case is illustrated by FIGS. 2 and 3 of the accompanying drawings. Since each line is required to be parallel to the vertical or horizontal axis of the display device, at least two vectors are required to make the link between link start and link end points. The overall routing strategy is to determine the position of an intermediate target point, from which either the end point can be reached directly, in a single vector, or else which gives access to a channel which is not obstructed, and which the next link can occupy. The channel is chosen to give easy access to the end point, and specifically to have a length equal to that of the bounding rectangle (i.e. the rectangle of which the link start and end points form opposite corners, as illustrated in FIG. 2). This is better shown in FIG. 3, which illustrates in more detail the essential features of the apparatus in accordance with the invention, FIG. 3 shows a part of a computer flow chart, including a starting box 11, and an end box 12.

The points A and B represent the points selected by the processing unit as link start and end points, and define opposite corners of a bounding rectangle. The bounding rectangle has sides parallel to the vertical and horizontal axes of the display device and dimensions equal to the vertical and horizontal displacement of the points A and B from each other.

Points A' and B' are then identified, as illustrated in FIG. 2, representing the other two corners of the bounding rectangle. A check is then carried out by the data processing device to establish whether or not a non-permitted obstacle, for example a further box, lies in the path A—A' or A—B' (the "first" and "second" lines respectively). In the embodiment illustrated in FIG. 3, it can be seen that the path A—A' is clear, but the path A—B' is blocked by a blocking item 14.

The intermediate target points A' and B' are the horizontal and vertical projections respectively from the vector start point A to the vector end point B.

In the simple case illustrated in FIG. 2, the link can be completed by either of vectors A'—B or B'—B (the "third" and "fourth" lines respectively), since no blocking item is present in either path. A choice between the two available paths can thereafter be made by any desired criteria.

In the arrangement shown in FIG. 3, vector A'—B is blocked by blocking item 15, and vector A—B' is blocked by blocking item 14. An alternative route must therefore be made, and the aim is to select the route which will yield both a reasonably short path, and a small number of vectors. Selecting the route on the basis of the length of the first vector will not necessarily yield the best route to the end point B, and therefore the choice is based on the determination of which route provides the best start point for the next part of the link.

A search is made to determine whether channels exist between lines A—A', and B'—B of the bounding rectangle, and between lines A—B' and A'—B of the bounding rectangle. In the embodiment illustrated, a vertical channel 16, and a horizontal channel 17 are located.

In FIG. 3, both channels 16 and 17 are not obstructed, for the whole of the respective dimension of the bounding rectangle, i.e. a link can be drawn with just two vectors from the start point A, to the opposite side of the bounding rectangle using either channel 16 or channel 17. In each case therefore, a value is stored in the data processing unit to indicate that the respective points c and D, joining point A to the centre of the channels 16 and 17, are allowable. Each of the points C and D is then treated as a new start point, and the process is repeated, to establish a route from points C and D respectively to end of point B. In the case illustrated in FIG. 3, both points C and D can be joined to end point B by means simply of two vectors, and in such a case, a choice can be made between the two allowable routes, in accordance with any desired criteria.

Alternatively, a choice can be made between routes C and D first, before the remainder of the link is investigated.

If there is a vector in the desired path, which is part of a link ending at the desired end point, and this vector can be reached without causing an error, a value is stored to indicate that the route is joinable, and a link is made with the vector at that point, and a corresponding display is generated on the display device.

If no channel is found within the bounding rectangle, then checks can be carried out to see whether a channel exists beyond the boundary of the bounding rectangle, by extending one of the lines AA' or AB'. In the embodiment illustrated in FIG. 3, the channel would be found for line AA', but no such check would be carried out on line AB', because that line is already marked as blocked by shape 14.

By this method, a number of alternative routes from the start point to the end point can if desired by established.

Various criteria can then be used to decide which of the possible routes will be utilised.

Alternatively, as indicated above, selection may be made of available vectors before the overall routing of the link is decided.

The following represents a list of possible selection criteria.

(1) If any of the target routes includes a join this route is chosen.

(2) If this is not the first vector created in this link, and a route exists which is in the same direction as the start vector, then this route is not used. (This prevents a vector being lengthened within the same channel, which does not enable a better next route to be gained.)

(3) Where at least two further vectors are needed to reach the end point, an escape direction from the start point should preferably be chosen which is not also an escape direction of the end point. This will generally result in a lower number of further vectors being required.

(4) Choose the route that is the longest.

If both the routes are the same length, then an arbitrary choice is made.

If all routes within the bounding rectangle are found to be blocked, then a blocking algorithm may be utilised. A suitable example is as follows.

The target directions are set to the escape directions of the start point that have not been tried yet. For each of these target directions the target point is set to avoid all the items that are in the bounding rectangle.

Starting with the longest target route, the furthest reachable point is found. If this is not the target point, then this target route cannot be used.

If more than one target route is possible, then various criteria can be used to select the "best" one. The following represents a list of possible criteria.

(1) If this is not the first vector in the link, and the shorter route is in the same direction as the previous vector, then this route is not used.

(2) Any vector having a direction opposite to a direction which is not allowed as an escape direction to the end point is deleted.

(3) If there is still more than one route the shortest one is used.

If no satisfactory route can be found, then no route is possible, and the temporary vectors associated with the values stored so far are deleted. In this event, it might be possible to use an appropriate box editor to move the position of one or other of the start or end shapes, or alternatively, it might be desirable in an extreme case where it is essential that a link should be made to produce a direct line between the start and end points. Such a direct line would violate the normal criteria that links are formed only parallel to the vertical and horizontal axes, but might be permitted under extreme circumstances.

The apparatus in accordance with the invention enables the production of a flow chart or the like, in which the links between boxes have a generally aesthetic appearance, incorporating only a small number of vectors. Once the each vector in the link has been established, the process is repeated, until an item is found, either a vector, or the end point, to which the link can be jointed. For each repetition of the process, the start point is taken as the end of the previous vector in the link.

If the route becomes blocked at any time, due either to the blocking item in the vector path, or to the absence of a channel for the next part of the route, the blocking routine outlined above can be utilised.

Using the apparatus of the invention, the size and shapes of the outlined shapes or boxes can readily be changed, either manually at the instruction of the user via the input device, or automatically, by the entry of additional text. Re-routing of links can be achieved very simply. The parts of the links which break the coincidence rules are found, and deleted. Those links are then redrawn, using the process outlined above. In this case however, the start point may be a vector, rather than a box.

Substantial textual editing facilities are preferably provided, since text forms a significant part of most design diagrams. Drawing office packages typically regard a text string as a single entity, which can only be created and deleted as a complete unit. Thus, any amendment required to the centre of a string can only be carried out by deleting the string and rewriting it.

The apparatus in accordance with the invention preferably includes facilities to provide the conventional screen text editor facilities provided by a basic word processor, for example insert, delete, cut, paste etc. If certain boxes have tabular fields, extensions to allow column editing are useful.

Preferably, facilities are provided for checking text as it is input, so that where specific rules apply to fields in particular boxes, for example text justification and positioning, and matching with adjacent fields, these factors can be taken into account. Finally, as indicated above, the shape and size of the box is preferably modified to provide an optimum fit around the text.

Figure 4:
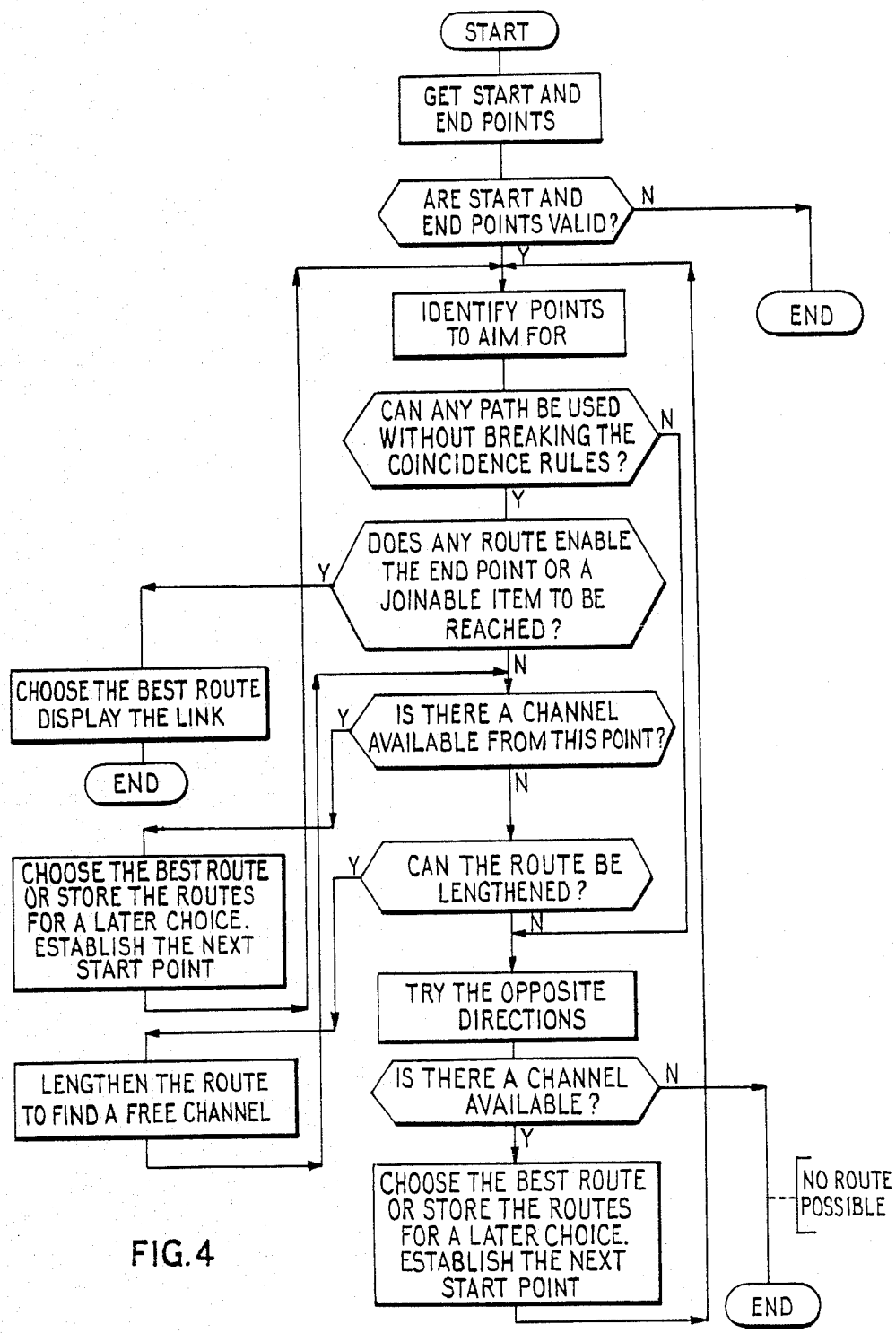
FIG. 4 is a flow chart illustrating a computer program suitable for implementing the method utilised in the apparatus.

FIG. 4 gives a general description of the method which may be embodied in a computer program, for linking two boxes together.

The apparatus in accordance with the invention may be embodied in a conventional computer workstation, in which the necessary computer instructions are embodied in read only memory (ROM), or random access memory (RAM).

In a particularly preferred embodiment, the data processing unit may be programmed and arranged so as to generate computer coding automatically from the graphical representation of linked boxes, thereby enabling the user to generate a complete computer program by the specification on the display device of appropriate boxes, with associated text, and links between such boxes.

I claim:

1. Apparatus for generating a flow chart consisting of boxes, joined by connecting links, the apparatus comprising:

A. a data processing unit;

B. an input device connected to said data processing unit; and

C. a display device which is also connected to said data processing unit and which has vertical and horizontal axes;

the data processing unit including means for causing display on the display device of a plurality of boxes and means for accepting from the input device data identifying a starting box and an end box, the processing unit further comprising means for causing display on the display device of a connecting link between the starting box and the end box, said data processing unit also including:

(a) means for defining a link start point associated with the starting box, and a link end point associated with the end box;

(b) means for calculating whether first and second lines joining the link start point and respective first and second intermediate target points are obstructed by a non-permitted obstacle, said lines being parallel respectively to the horizontal and vertical axes of the display device, and having a length equal respectively to horizontal and vertical displacement of the link end point from the link start point, such that said intermediate target points may be joined to the link end point by respectively third and fourth lines parallel respectively to the vertical and horizontal axes;

(c) means for determining when no such obstacle is discovered, whether the said third and fourth lines joining said intermediate target pints, and the link end point, are obstructed by non-permitted obstacles, and for generating when no obstacle is encountered to the third and fourth lines, a connecting link on the display device, composed of the first and third, or of the second and fourth said lines;

(d) means for determining, when either said first and said second lines are obstructed, whether a channel exists which is not obstructed by non-permitted obstacles, said channel joining the respective first or second line, and a line parallel thereto, and displaced therefrom by respectively vertical or horizontal displacement of the link start point from the link end point; and (e) means for storing a value to indicate the first and second lines respectively to be allowable, in accordance with whether or not a corresponding channel is found to exist for said lines respectively, and means for defining a junction of the channel with the respective first or second line as a new start point, in construction of a desired connecting link.

2. Apparatus as claimed in claim 1, including means for determining, in the event that both the third and fourth lines are obstructed by non-permitted obstacles, and at least one of the first and second lines are not obstructed by non-permitted obstacles, whether a channel exists which is not obstructed by a non-permitted obstacle, said channel joining an extension of the respective non-obstructed first or second line and a line parallel thereto and displaced therefrom by respectively vertical or horizontal displacement of the link start point from the link end point, and means for defining as a new start point a junction of said channel with respective non-obstructed first or second line.

3. Apparatus as claimed in claim 1 including means for determining, when both the said first and second lines are obstructed by a non-permitted obstacle, whether a fifth line extending from the link start point away from the link end point, parallel to the vertical or horizontal axes is obstructed by a non-permitted obstacle, and means for determining when said fifth line is not obstructed whether a channel exists which is not obstructed by a non-permitted obstacle wherein the said channel joins said fifth line and sixth line, parallel to the fifth line and displaced therefrom by respectively the horizontal or vertical displacement of the link end point from the link start point, and means for defining as a new start point a junction of said channel with the fifth line.

4. Apparatus as claimed in claim 1 wherein the input device includes means for inputting text to be displayed in association with the said boxes, and wherein the processing unit includes means for varying automatically size and/or shape and/or position of boxes displayed on the display device, in accordance with the text input.

5. Apparatus as claimed in claim 4, including means for determining whether a box which has been changed in size, shape or position, obstructs one or more links, and for deleting from the display device the said one or more links, and wherein the said processing unit is adapted to re-draw the said one or more deleted links.

6. Apparatus as claimed in claim 1, wherein the said link start point and link end point are each outside of the respective starting and end box.

7. Apparatus as claimed in claim 1, wherein the display device is a visual display unit, or a printing device.

8. Apparatus as claimed in claim 1, including means for detecting whether a said first, second, third, fourth or fifth line crosses an existing link terminating at the link end point, and for generating a node at point of intersection, when said existing link terminates at the said link end point.

9. Apparatus as claimed in claim 1, including means for setting position of a line in a said channel to the center of said channel.

* * * * *